(12) United States Patent
Bettis et al.

(10) Patent No.: US 7,304,224 B1
(45) Date of Patent: Dec. 4, 2007

(54) EXERCISE AND TRAINING DEVICE FOR ACOUSTIC GUITAR PLAYERS

(76) Inventors: Linda P. Bettis, 3595 Bardell Ave., Eugene, OR (US) 97401; Barry J. Bettis, 3595 Bardell Ave., Eugene, OR (US) 97401

( * ) Notice: Subject to any disclaimer, the term of this patent is extended or adjusted under 35 U.S.C. 154(b) by 0 days.

(21) Appl. No.: 11/538,808

(22) Filed: Oct. 5, 2006

(51) Int. Cl.
*G10D 3/00* (2006.01)

(52) U.S. Cl. .................................................. 84/293

(58) Field of Classification Search ............... 84/293, 84/267, 722, 724, 731, 725, 629, 713–715, 84/646, 649–653
See application file for complete search history.

(56) References Cited

U.S. PATENT DOCUMENTS

| | | | |
|---|---|---|---|
| 3,218,904 A | 11/1965 | Hartman | |
| 3,724,314 A | 4/1973 | Columbo | |
| 4,286,495 A | 9/1981 | Roof | |
| 4,318,327 A | 3/1982 | Toups | |
| 4,364,298 A | 12/1982 | Piazza | |
| 4,505,178 A | 3/1985 | Redman | |
| 4,545,281 A * | 10/1985 | Habicht | 84/315 |
| 4,739,689 A | 4/1988 | Cacioppo et al. | |
| 4,748,890 A | 6/1988 | Tutaj | |
| 4,765,608 A | 8/1988 | Bonasera | |
| 4,807,509 A | 2/1989 | Graham | |
| 5,380,948 A | 1/1995 | Freimuth et al. | |
| 5,540,133 A | 7/1996 | Draper et al. | |
| 5,756,914 A | 5/1998 | Streibl | |
| D403,012 S | 12/1998 | Anderko | |
| 5,952,595 A | 9/1999 | Carnell | |
| 6,127,615 A | 10/2000 | Rosenberg | |
| 6,162,981 A * | 12/2000 | Newcomer et al. | 84/485 R |
| 6,315,698 B1 | 11/2001 | Barber | |
| 2002/0029681 A1 | 3/2002 | Manning | |
| 2005/0039592 A1 | 2/2005 | Willard | |
| 2005/0109196 A1 | 5/2005 | Whiteside | |
| 2007/0113720 A1* | 5/2007 | Shaffer | 84/314 R |

FOREIGN PATENT DOCUMENTS

| | | |
|---|---|---|
| GB | 2 092 816 A | 8/1982 |
| JP | 2003-216019 | 7/2003 |

* cited by examiner

*Primary Examiner*—Kimberly Lockett
(74) *Attorney, Agent, or Firm*—Christopher Wood; Wood & Eisenberg, PLLC

(57) ABSTRACT

A practice and exercise device for acoustic guitar players. The device includes a housing, a plurality of strings, and a circuit to generate a sound having a tone, wherein the tone is selected from the group consisting of A, D, and E tones. The circuit is housed in the housing and includes touch sensitive switches, which are in operable communication with the fingerboard. The housing defines a front surface that in turn defines a fingerboard. The fingerboard includes at least one fret fixed transversely across the fingerboard and visually distinguishable markings. The markings are located at positions on the fingerboard corresponding to tones A, D, and E, and the touch sensitive switches are located beneath the markings.

9 Claims, 8 Drawing Sheets

EXERCISE AND TRAINING DEVICE FOR ACOUSTIC GUITAR PLAYERS

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to practice and exercise devices for stringed instruments and in particular acoustic guitars.

BACKGROUND OF THE INVENTION

The classical guitar is a stringed musical instrument of the lute class in which taut strings provide the source of sound. Usually it possesses a long fretted neck and six strings, which are played by strumming or plucking. It has a compass of over three octaves and its six strings are tuned to E, A, D, G, B and E from the lowest to the highest pitches respectively. Unlike the stringed instrument of the violin family, guitar is played by twitching the fingers of the right hand (plucking hand) across the strings, while the fingers of the left hand (fretting hand) are positioned on one or more of the strings as the appropriate frets in order to obtain the desired chords.

In the past, those learning to play the acoustic guitar typically spent numerous hours practicing over many days to strengthen finger muscles and develop calluses, particularly on the fretting hand. Once finger strength and calluses are developed the player will experience less discomfort when playing the guitar. Most students with sufficient dedication continue to practice regularly until they reach a plateau in their ability wherein further improvement would demand much more of their time and resources. After this point many guitar players spend less time playing and, without the stimulation thus provided, loose those hard-won calluses. When these are gone, playing becomes somewhat painful. Thus, there is a need for a device that enables new and seasoned guitar players to keep those hard-won calluses and maintain good fret hand coordination.

Learning to play the guitar requires learning the particular locations for strings and frets as well as developing or maintaining the ability to quickly and easily depress the proper string locations. The beginning guitar student will find that there are two essential steps for playing a chord correctly on the guitar: (1) pressing down on the correct locations; and (2) pressing down all three fingers firmly, simultaneously and making contact with the fingerboard. When first learning to play guitar, the player's weaker fingers generally do not press down all the way to the fingerboard. So it is necessary to build up the calluses as well as strengthen fingers through daily practice in order to effectively play this musical device. Thus, there is also a need for a training or practice device that enables less skilled players to develop calluses and strengthen fingers.

In the recent past, the guitar has undergone various changes in its shape, functioning, usage, etc., thereby reducing the difficulty in handling the device. Presently, there are various 'guitar chord finder devices' available to help make guitar playing easier. These devices help the beginning guitar player learn the various chords needed to play the guitar successfully.

U.S. Patent Publication No. 20050109196 describes a handle for grasping by one hand and a neck with a fingerboard for fingering with the other hand for use by stringed instrument players. The fingerboard is correlated to a section of the fret-board of a conventional stringed instrument such as a guitar, bass, or banjo. The fingerboard has string ridges that provide a pressure-resistant feel to simulate playing the corresponding string instrument.

U.S. Patent Publication No. 20020029681 describes a "Guitar chord finder device", which is said to aid beginning guitar players in learning the various chords needed to play the guitar successfully. The device may be used in either learning or testing mode. The design of the device resembles the exact shape of the first four frets on a regular guitar, plus an additional space at the bottom (of about two inches), which contains various switches used to operate the unit. In the digital learning mode, when the user selects one of the basic guitar chords the corresponding proper finger location will light up on the fret board for that given chord. The user then places his/her fingers on the indicated location and a green light will appear once the fingers are placed in the proper positions. In the digital testing mode, the user selects one of the basic guitar chords and then he/she has to place his/her fingers on the proper location on the fret board, without the digital lights indicating where the spots are. If the fingers are placed in the correct locations the green light will signal a successful attempt. The device can be held in one hand or two, as there will be a sliding rule on the back for adjusting positions.

U.S. Pat. No. 6,127,615 describes a stringed-instrument practice device for improving a player's rhythm-hand technique involved in playing a stringed instrument. In one embodiment, the '615 device is described as comprising a generally rectangular base having a plurality of tunable strings. The base has two rests thereon with a series of fixed screws for fixing one end of each string and a series of adjustable screws for attachment to the other end of each string. Adjustment of the adjustable screws allows adjustment of the tension in each string. The practice device is desirably fitted with a transducer/microphone that allows connection of the instrument to an external amplifier and may have an in-built rhythm generator, amplifier, earphone jack or speaker, and controls incorporated into the device.

U.S. Pat. No. 4,505,178 describes a training device said to be useful for people who play guitar or similar stringed instruments. Its main purpose is to build hard callus pads on the ends of the fingers used in chording the guitar. Its secondary purpose is to strengthen the muscles used to press strings against frets. To accomplish the first, the device is provided with raised edges simulating the cross-section and texture of actual guitar strings. To meet the second need, the edges are mounted on a spring-loaded button to simulate the give and tension felt in making chords.

UK Patent Publication No. GB 2092816-A describes an electronic device in the form of a rectangular box used for teaching musical instruments such as guitars, wherein the upper surface of the device has two sections designed to represent a guitar. One section is opaque except for narrow strips representing the strings of the instrument. The second section is provided with two banks of push buttons, a clear button and a switch. Lines of light emitting diodes are provided under the strips to simulate fingering positions. By operating appropriate buttons, notes or chords in any selected key can be displayed in the correct positions so that the correct fingering position can be taught.

In addition, Japan Patent Publication No 2003-216019 describes a guitar finger-training machine described as addressing the problems pertaining to finger pain due to training for long time when a trainee trains the finger operation of the guitar by using the real guitar.

SUMMARY OF THE INVENTION

A practice and exercise device for acoustic guitar players. The device includes a housing, a plurality of strings, and a circuit to generate a sound having a tone, wherein the tone is selected from the group consisting of A, D, and E tones. The circuit is housed in the housing and includes touch sensitive switches, which are in operable communication with the fingerboard. The housing defines a front surface that in turn defines a fingerboard. The fingerboard includes at least one fret fixed transversely across the fingerboard and visually distinguishable markings. The markings are located at positions on the fingerboard corresponding to tones A, D, and E, and the touch sensitive switches are located beneath the markings.

BRIEF DESCRIPTION OF THE DRAWINGS

Similar reference characters denote corresponding features consistently throughout the attached drawings.

DETAILED DESCRIPTION OF THE INVENTION

Figure 1:
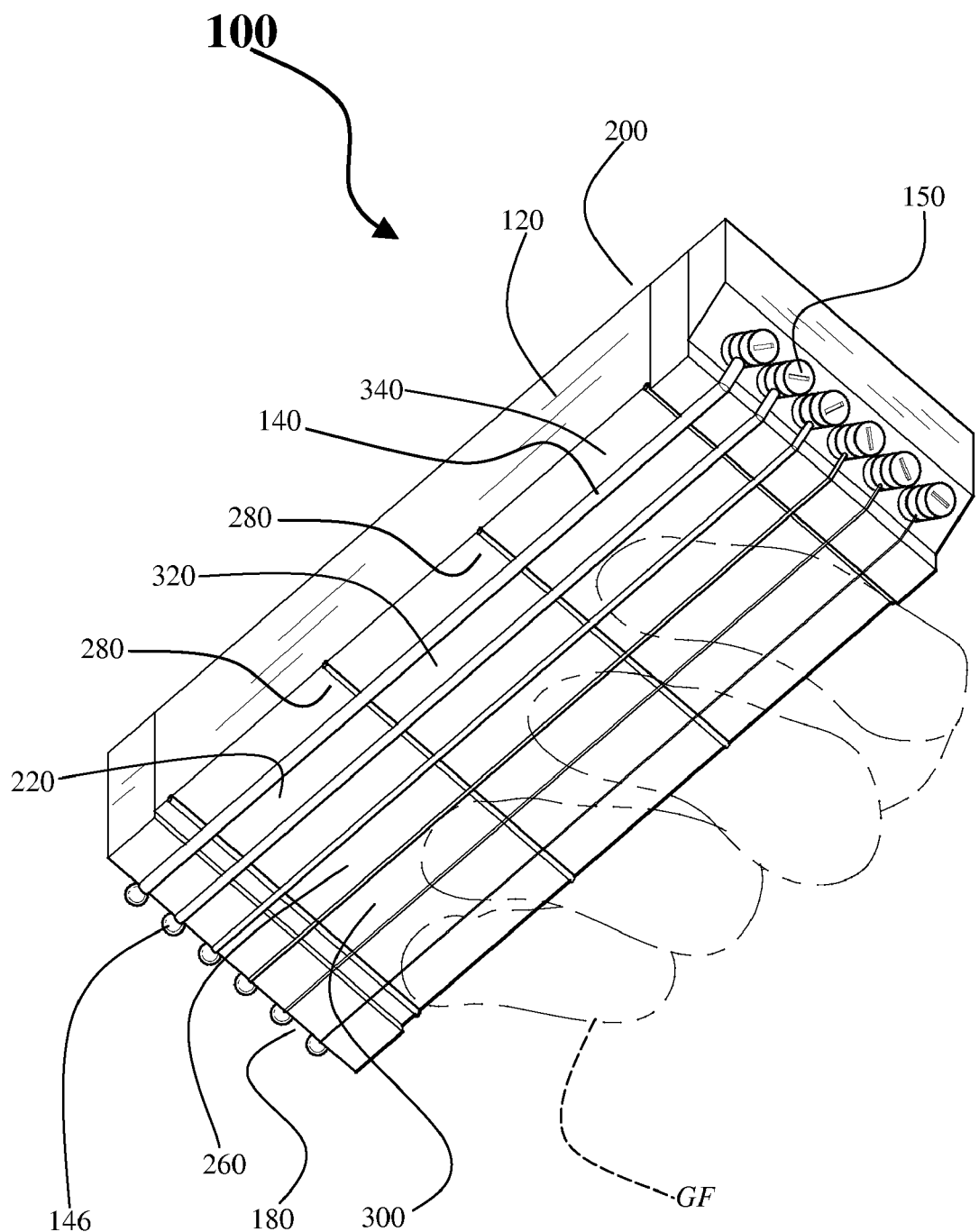
FIG. 1 is a perspective environmental view of a practice and exercise device according to the present invention.

The present invention is directed to practice and exercise devices for stringed instruments and in particular acoustic guitars. The practice and exercise device of the present invention is denoted generally by the numeric label "100".

Referring to the FIGURES in general, the practice and exercise device 100 includes a housing 120, a plurality of strings 140, and a circuit 160. The housing 120 respectively includes first and second opposite ends 180 and 200, and front and rear surfaces 220 and 240, respectively.

An optional thumb insert 110 is attached to rear surface 240. The front surface 220 defines a fingerboard 260. The fingerboard 260 comprises at least one fret 280 fixed transversely across the fingerboard 260. The plurality of strings 140 are disposed between the first 180 and second 200 opposite ends of housing 120. The strings 140 are disposed at a predetermined clearance above the fingerboard 260. The front surface 220, which defines fingerboard 260, is preferably flat. The rear surface 240 is preferably flat as this works well with regard to the thumb insert 110. The combination of thumb insert 110 and flat rear surface 240 enables the practice and exercise device 100 to be a one-handed device wherein chord changes can be made by a player without having to use both hands. The Applicant believes that the combination of a flat rear surface 240 and thumb insert 110 is unique to this invention.

The number of strings 140 is typically six to mimic the number of strings found on a typical acoustic guitar. However, the number of strings 140 can be less to mimic scenarios where an acoustic guitar is played in a concert with an inadvertent broken string. The housing 120 is designed to mimic a section of the neck of an acoustic guitar. The fingerboard 260 may comprise any suitable number of frets such as two frets thereby defining three sections 300, 320 and 340 with respect to fingerboard 260. The frets 280 can be made out of any suitable material such as, but not limited to, clear polished nylon with a thickness corresponding to the thickness of frets found on the neck of acoustic guitar; e.g., a gauge of about 0.040 inches would suffice.

The circuit 160 is used to detect when a guitarist's fingers GF are applying pressure at appropriate points on fingerboard 260 to generate a sound with a tone selected from the group consisting of A, D, and E tones. The circuit 160 comprises a plurality of touch sensitive switches (162, 164, 166, 168, 170, 172, 174, 176, and 178), a tone E generator 380, a tone A generator 400, a tone D generator 420, a speaker 440 and a power source 460. The touch sensitive switches are integrated into the surface of the fingerboard 260. Parts of the circuit 160 can be housed in housing 120 such as the power source 460.

The plurality of touch sensitive switches defines first 480, second 500 and third 520 branches of touch sensitive switches. Each branch comprises three touch sensitive switches. The first 480, second 500 and third 520 branches are respectively operably connected to tone E generator 380, tone A generator 400, and tone D generator 420. Each of the tone generators is in operable communication with speaker 440. Each switch in the first 480, second 500, and third 520 branches is overlaid with a visually distinguishable marking 530.

Figure 8:
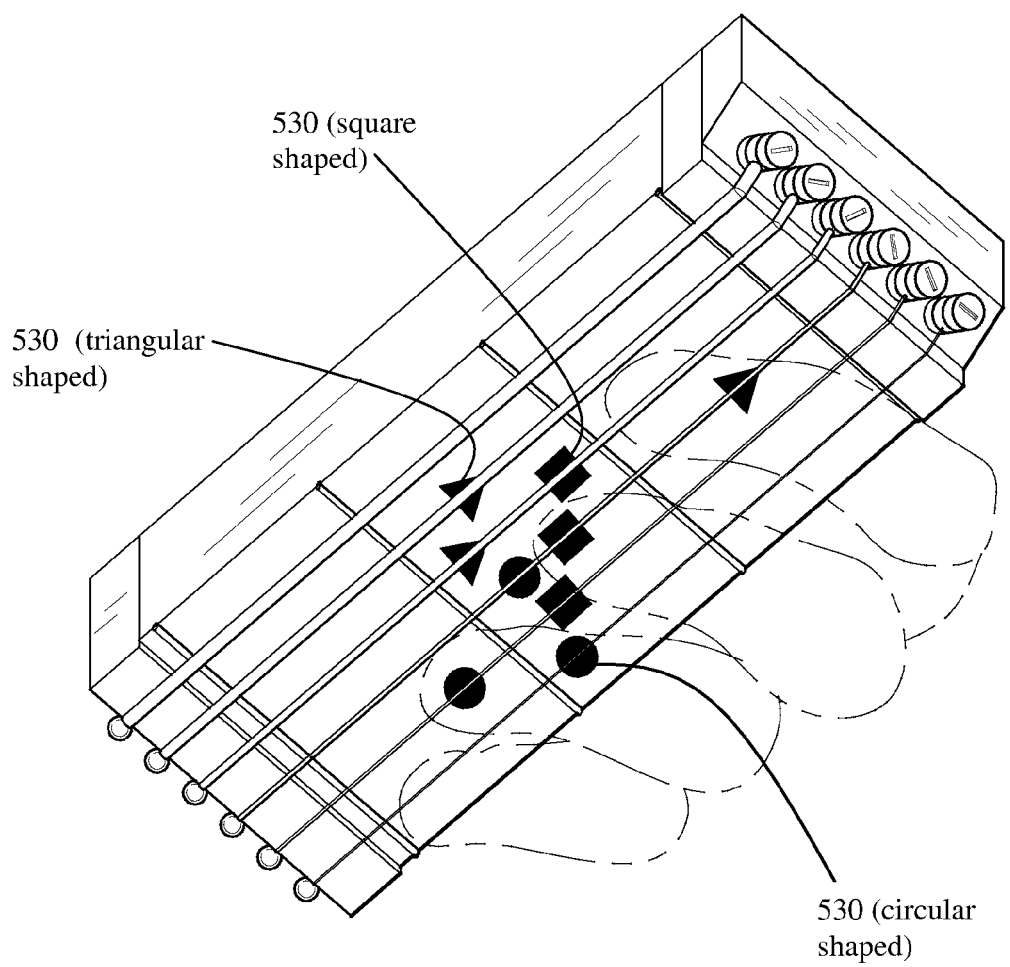
FIG. 8 shows a perspective view of a practice and exercise device according to the present invention.

The visually distinguishable markings 530 can be in any suitable form such as, but not limited to: square, triangular and circular shaped dots as shown in FIG. 8. For example, the visually distinguishable markings 530 can take the form of a colored arrangement of dots that serve to guide the player in determining the correct positions for the player to apply pressure on the fingerboard to achieve a desired tone selection. The visually distinguishable markings 530 can have at least one shape selected from the group consisting of: a circular shape, a regular polygonal shape, and an irregular polygonal shape. The visually distinguishable markings 530 can have at least one shape selected from the group consisting of: a circular shape, a square shape, a triangular shape, a star shape, and a rectangular shape. However, the visually distinguishable markings 530 can be shaped or colored in any suitable fashion. The visual distinguishable markings 530 help guide a guitar player in the correct positioning of the guitar player's fingers GF on fingerboard 260 to produce a desired tone.

The player typically applies sufficient selective pressure by pressing down on the strings 140 to bring the strings into contact with the correct choice of markings 530 to activate a group of three switches in the first 480, second 500 or third 520 branch of switches to respectively generate an E, A or D tone.

Tone E is generated via speaker 440 when a guitarist's fingers are aligned over and applying pressure on each switch in the first branch 480. Tone A is generated via speaker 440 when a guitarist's fingers are aligned over and applying pressure on each switch in the second branch 500. Tone D is generated via speaker 440 when a guitarist's fingers are aligned over and applying pressure on each switch in the third branch 520.

The dimensions of the practice and exercise device 100 can have any suitable values. For example, the device 100 can be about four inches long, about one inch in thickness and about 2 inches wide. The practice and exercise device 100 can have any suitable thickness value to mimic the thickness of an acoustic guitar neck comprising the first three frets proximate to the acoustic guitar's headstock HS and tuning pegs TP (see FIG. 7). Non-limiting examples of suitable thickness include: about 1.5 inches, about 2 inches and about 2.5 inches.

Referring specifically to the FIGURES of which FIG. 1 shows a perspective environmental view of the practice and exercise device 100. The practice and exercise device 100 is fashioned to mimic a section S of the neck N of an acoustic guitar AG (see prior art FIG. 7). The practice and exercise device 100 is typically held in the player's left hand with the players thumb inserted into optional thumb insert 110 (shown, for example, in FIG. 6A). The practice and exercise device 100 includes housing 120 and a plurality of strings 140. The housing 120 respectively includes first and second opposite ends 180 and 200, and front and rear surfaces 220 and 240 (rear surface 240 is shown, for example, in FIG. 6B), respectively. The front surface 220 defines fingerboard 260. The fingerboard 260 comprises at least one fret 280 fixed transversely across the fingerboard 260. The frets typically do not touch the strings 140. The clearance between each string and the fingerboard 260 can be any suitable value such as, but not limited to, about 3⁄32".

Still referring to FIG. 1, the plurality of strings 140 are disposed between the first 180 and second 200 opposite ends of housing 120. Each string 140 is shown with a ball end 146 and a small tension screw 150 at the other end. More specifically, each string 140 is knotted and wound clock-wise onto a small tension screw 150. The tension screws 150 are turned clock-wise to tighten each attached string. Strings 140 do not require constant tuning because sound is generated electronically by circuit 160 (see FIG. 3). It should be noted that any suitable means might be used to secure the strings 140 between the first 180 and second 200 ends of housing 120.

Figure 2:
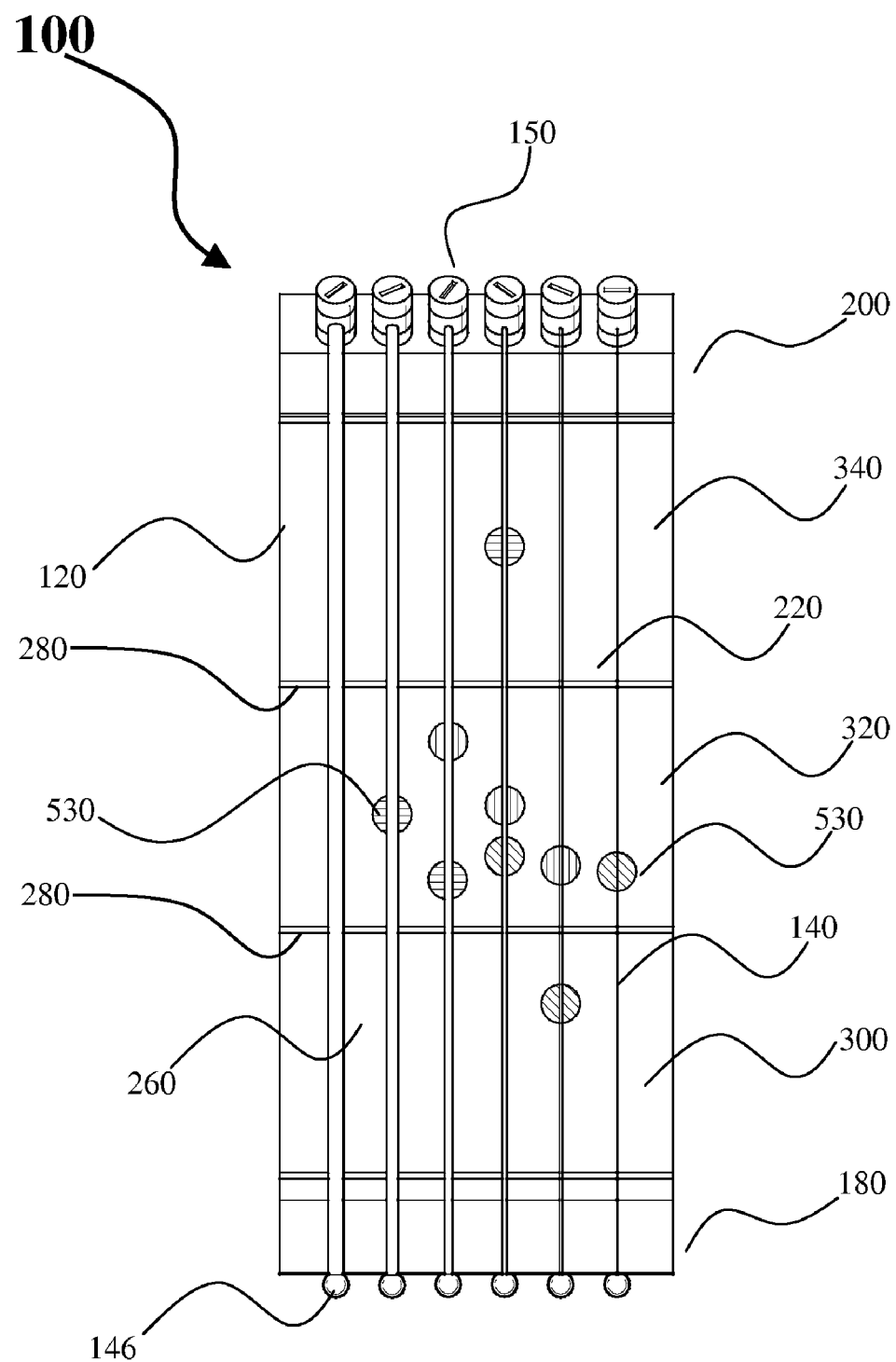
FIG. 2 shows a top planar view of the practice and exercise device of FIG. 1.

FIG. 2 shows a top planar view of the practice and exercise device 100. Strings 140 (typically six strings) are disposed between first and second ends 180 and 200 of housing 120. Strings 140 are disposed at a predetermined clearance above the fingerboard 260, e.g., about 3⁄32" inches above the fingerboard 260. Markings 530 are positioned at selected points on the fingerboard 260 and beneath the strings 140 as shown.

Figure 3:
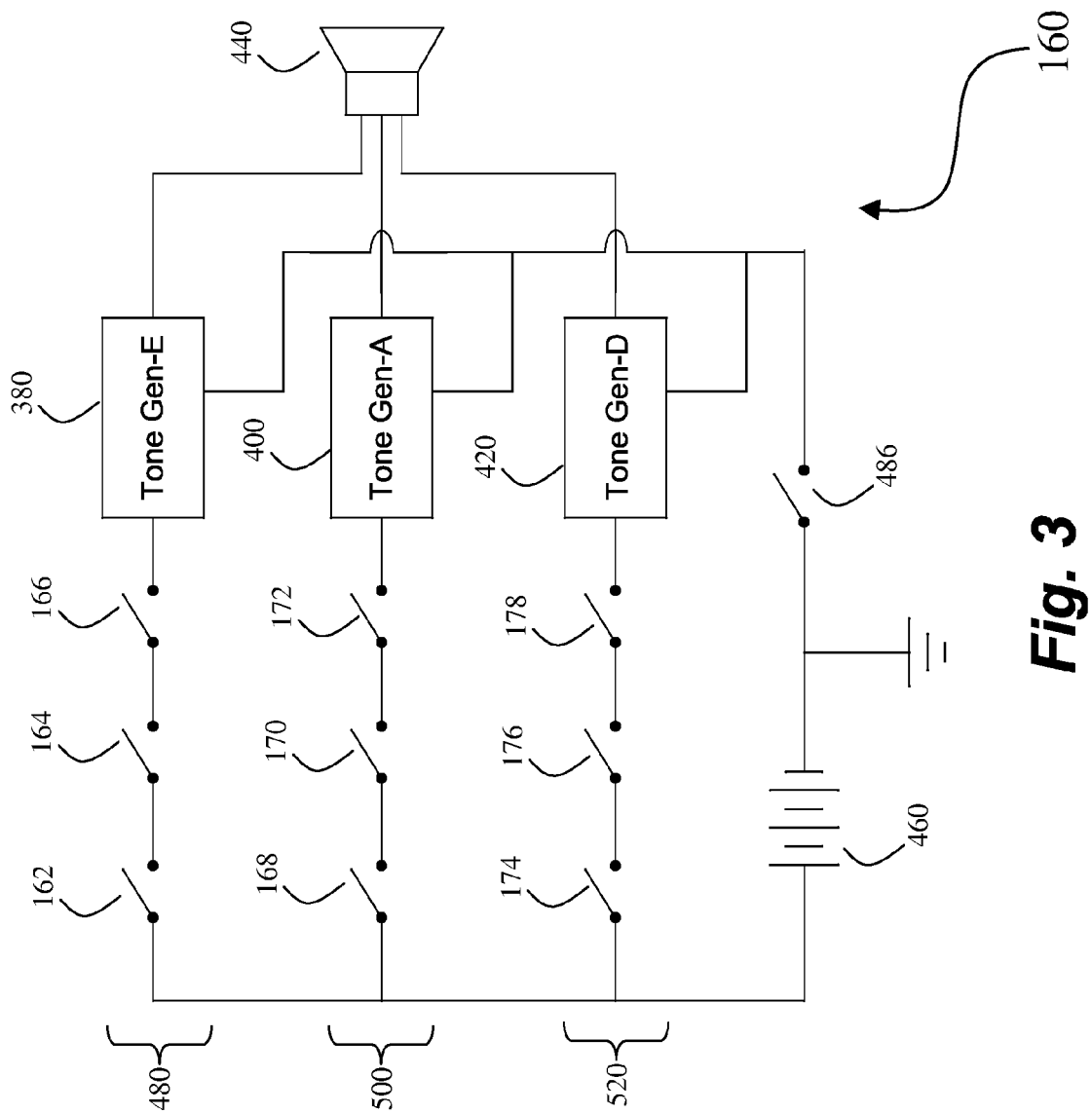
FIG. 3 shows a circuit according to the present invention.

Markings 530 are positioned above the touch sensitive switches (see circuit diagram shown in FIG. 3). The markings, which can be in the form of variously shaped dots, are located at positions corresponding to the same positions on an acoustic guitar's neck corresponding to tones A, D and E. Thus, a player can practice by holding down the strings at appropriate points guided by the markings 530 to produce a desired tone.

Figure 7:
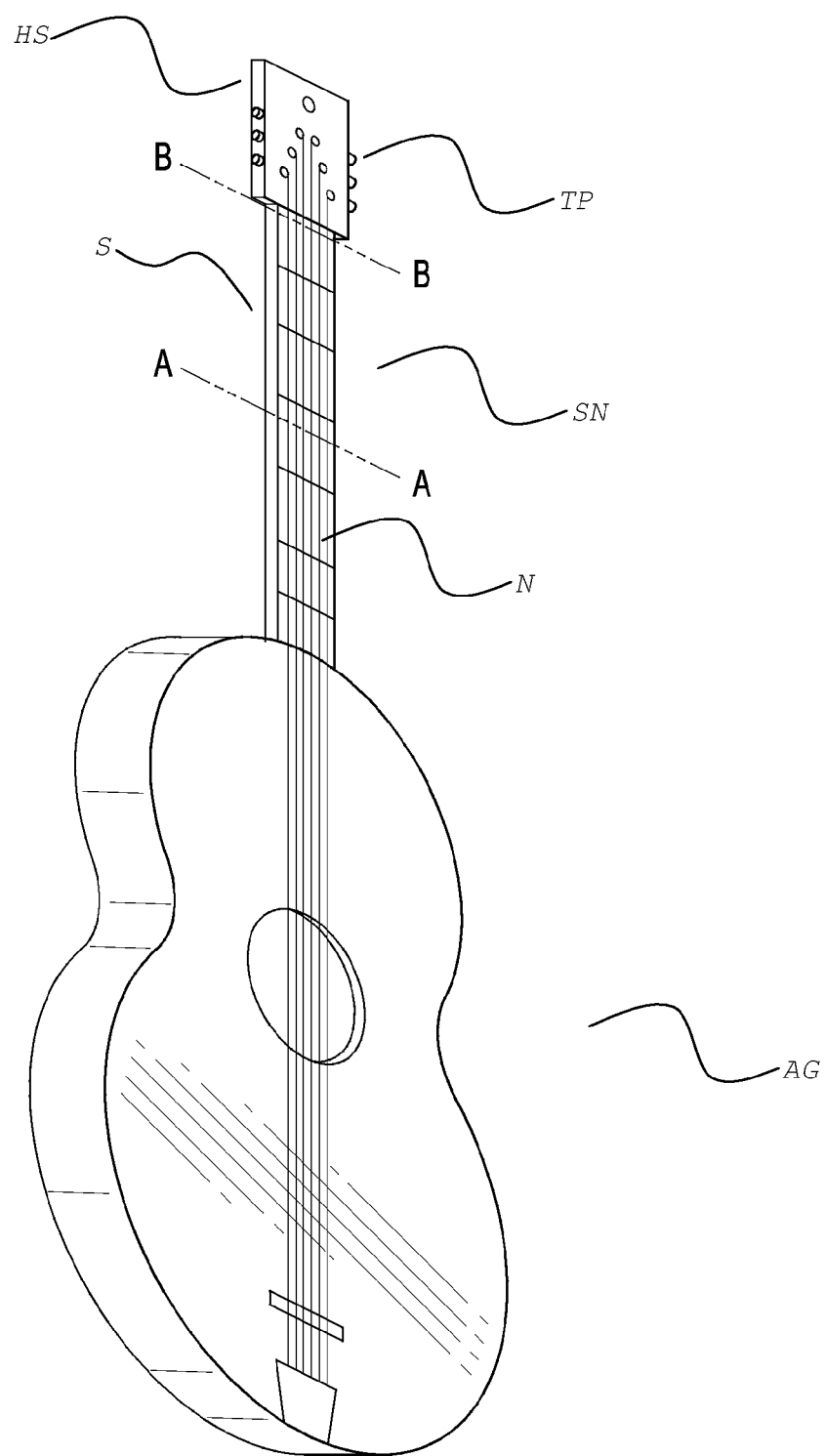
FIG. 7 is a perspective view of a typical acoustic guitar.

The electronic practice device 100 is designed to mimic a section SN of the neck N of an acoustic guitar AG (see FIG. 7); more specifically, a section of acoustic guitar neck SN comprising the first few acoustic guitar frets located proximal to the tuning pegs TP (see FIG. 7). For example, the electronic practice device 100 is designed to mimic a section of the neck enclosed by the dotted lines A-A and B-B (see FIG. 7). It should be understood that the electronic practice device 100 could be designed to mimic a section of the neck of any stringed instrument.

Referring to FIG. 3, which shows a diagram of circuit 160, circuit 160 includes first, second and third branches 480, 500 and 520, respectively. The first branch 480 includes touch sensitive switches 162, 164, and 166. The second branch 500 includes touch sensitive switches 168, 170, and 172. The third branch 520 includes touch sensitive switches 174, 176, and 178. Tone E generator 380 is shown located in branch 1 where it is in series with touch sensitive switches 162, 164, and 166; tone A generator 400 is shown located in branch 2 where it is in series with touch sensitive switches 168, 170, and 172; and tone D generator 420 is shown located in branch 3 where it is in series with touch sensitive switches 174, 176, and 178. The tone generators 380, 400 and 420 are operably connected to speaker 440. The tone generators can be obtained from any suitable source such as, but not limited to, tone generators based on kit number TD1 Tone Encoder/Decoder, which can be obtained from Ramsey Electronics, Inc., 580 Fishers Station Drive, Victor, N.Y. 14564.

Still referring to FIG. 3, the touch sensitive switches 162, 164, 166, 168, 170, 172, 174, 176, and 178 are located on the fingerboard 260 at locations corresponding to the same locations on an acoustic guitar fret board to provide appropriate tone output when the player applies pressure to the strings 140 at the appropriate places. Specifically, tone E is generated when touch sensitive switches 162, 164, and 166 are closed; tone A is generated when touch sensitive switches 168, 170, and 172 are closed; and tone D is generated when touch sensitive switches 174, 176, and 178 are closed. Each touch sensitive switch is associated with a visual marking. For example, touch sensitive switches in the first, second and third branches (respectively corresponding to tones E, A and D) could be overlaid with blue, red, and green dots, respectively. If color is chosen as the distinguishing feature with respect to markings 530, then it should be understood that any suitable color combination can be used. Color, however, is not required. For example, touch sensitive switches in the first, second and third branches (respectively corresponding to tones E, A and D) could be overlaid with square, circular, and star shaped dots, respectively.

The circuit 160 also includes a power source 460, and an on/off switch 486. The power source 460 may include disposable battery, rechargeable batteries (e.g., one 3-volts or two 1.5 volt), lithium battery, Duracell battery, 120 Voltage source with AC/DC converter, and a solar power source. In addition, the speaker 440 can be an integrated speaker, removable speaker, wire earpiece, wire earbud, wire earplug, wireless earpiece, wireless earbud, wireless earplug, wire headphone, wireless headphone, Wi-fi earpiece, or a Bluetooth operated earpiece. The housing 120 might comprise sound holes to facilitate the passage of sound from the speaker 440.

Figure 4A:
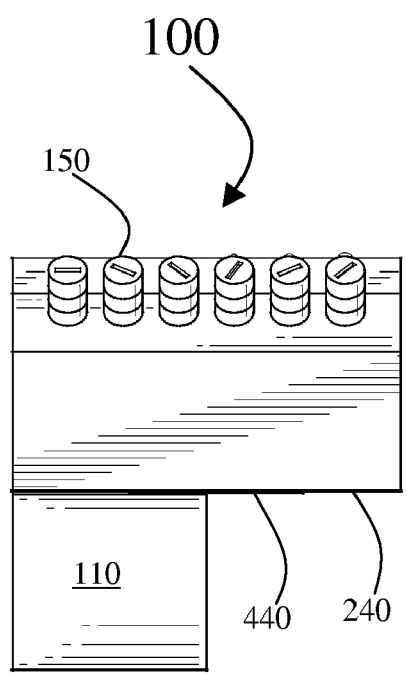
FIGS. 4A and 4B respectively show first and second end views of the practice and exercise device of FIG. 1.
Figure 4B:
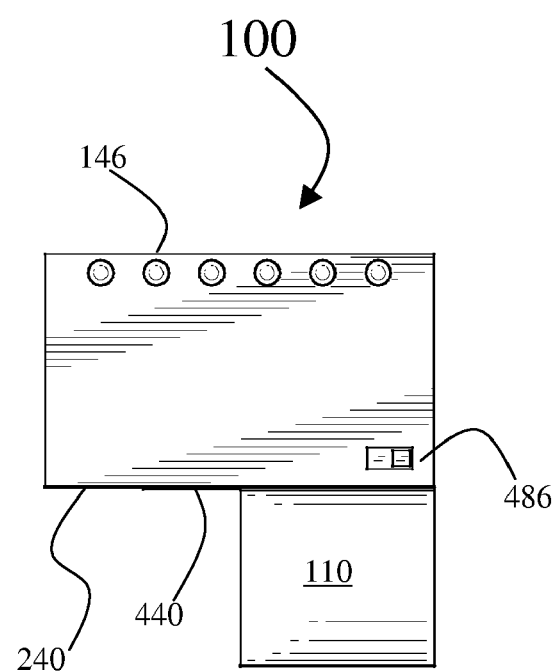

FIGS. 4A and 4B respectively show first and second end views of the practice and exercise device 100. The optional thumb insert 110 is shown attached to the flat rear surface 240. The optional thumb insert 110 enables a player to hold the practice and exercise device 100 in one hand. Thus, a player can practice with the device 100 while waiting, for example, in a dinner line, while sitting on a park bench, while waiting for a cab, traveling on a train, etc.

Figure 5:
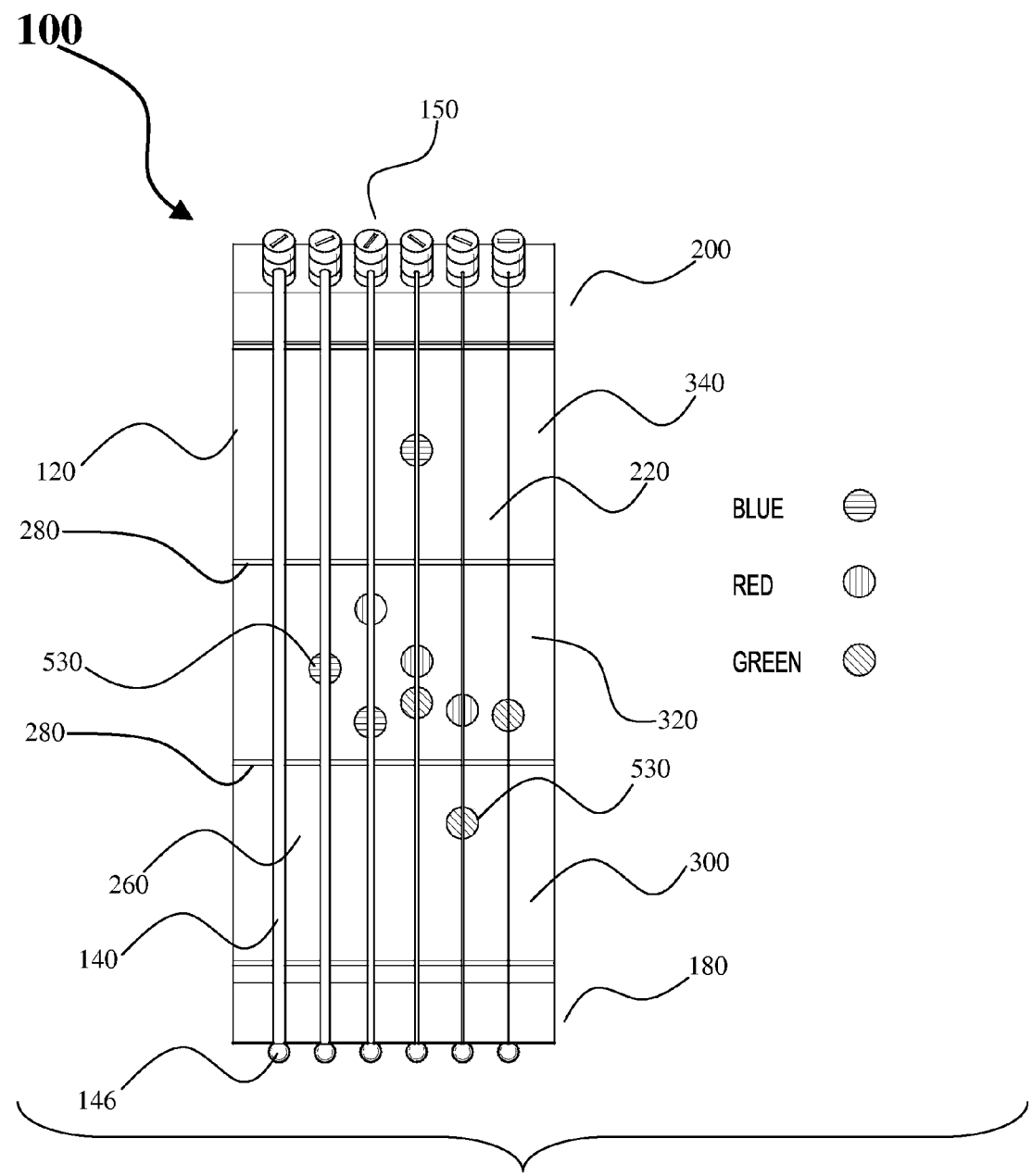
FIG. 5 shows a non-limiting example of a color scheme to guide a player in the correct placement of pressure on the fingerboard according to one aspect of the present invention.

FIG. 5 shows a non-limiting example of a color scheme applied to the markers 530 to guide a player in the correct placement of pressure on fingerboard 260 to attain a desired tone output. In FIG. 5, the blue colored markers 530 correspond to branch I and tone E; the red colored markers 530 correspond to branch II and tone A; and the green colored markers 530 correspond to branch III and tone D. More specifically, touch sensitive switches 162, 164, and 166 are overlaid with the blue colored markers; touch sensitive switches 168, 170, and 172 are overlaid with the red colored markers; and touch sensitive switches 174, 176, and 178 are overlaid with the green colored markers. However, it should be understood that the markers 530 can be differentiated using any appropriate methodology.

Figure 6A:
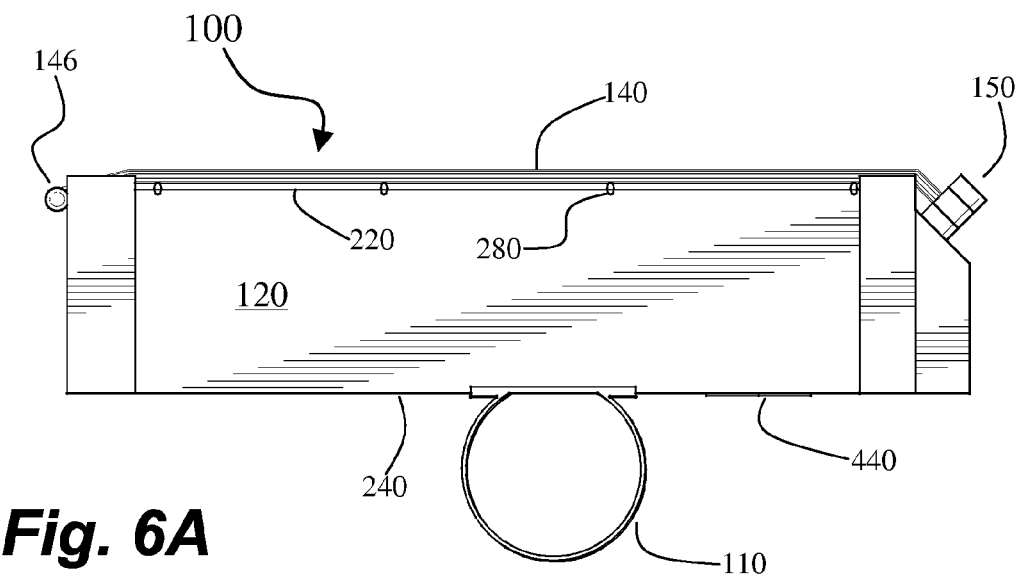
FIG. 6A shows a lengthwise side view of the practice and exercise device of FIG. 1.
Figure 6B:
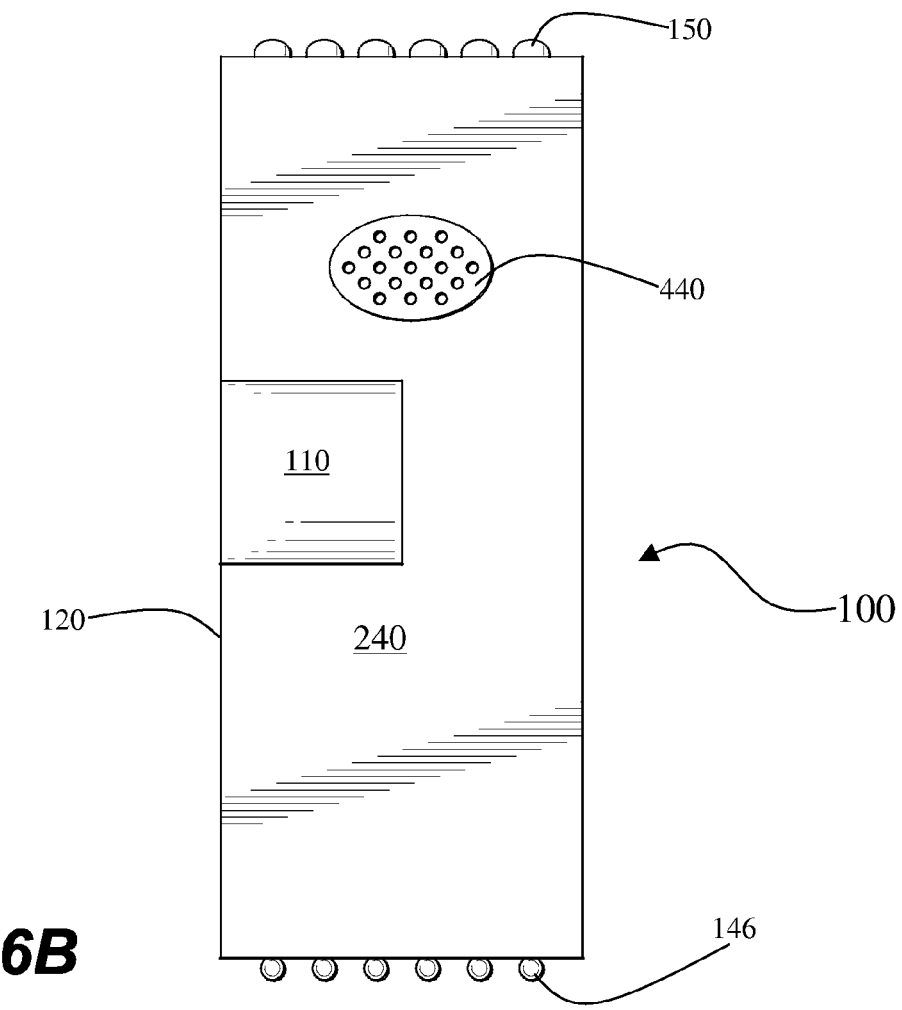
FIG. 6B shows a bottom planar view of the practice and exercise device of FIG. 1.

FIGS. 6A and 6B respectively show a lengthwise side view and a bottom planar view of the practice and exercise device 100. It should be understood that the illustrated location of the speaker 440 is non-limiting. The speaker 440 can be located at any suitable location. While the speaker 440 is shown located on the rear surface 240 of housing 120, the speaker 440 may be located inside the housing 120.

FIG. 7 is a perspective view of a typical acoustic guitar AG. The acoustic guitar includes neck N. The practice and exercise device 100 mimics a section of the guitar neck N such as section S enclosed between dashed lines A-A and B-B.

It is to be understood that the present invention is not limited to the embodiments described above, but encompasses any and all embodiments within the scope of the following claims.

We claim:

1. A practice and exercise device for acoustic guitar players, comprising:
   a housing having first and second opposite ends, a front surface and a flat rear surface extending between said first and second ends, said front surface being a substantially flat surface, wherein said front surface comprises a fingerboard, said fingerboard comprising at least one fret fixed transversely across said fingerboard, wherein a thumb insert is attached to said rear surface;
   a plurality of strings disposed between said first and second ends of said housing, further wherein said plurality of strings are disposed at a predetermined clearance above said fingerboard; and
   a circuit to generate a sound having a tone, wherein the tone is selected from the group consisting of A, D, and E tones, said circuit is housed in said housing, said circuit comprising touch sensitive switches, said touch sensitive switches are in operable communication with said fingerboard,
   whereby the combination of said flat rear surface and said thumb insert enables a player to change chord changes using just one hand to hold and play said practice and exercise device.

2. The practice and exercise device according to claim 1, wherein said fingerboard includes visually distinguishable markings, said visually distinguishable markings are located at positions on said fingerboard corresponding to tones A, D, and E, wherein said touch sensitive switches are located beneath said markings.

3. A practice and exercise device for acoustic guitar players, comprising:
   a housing having first and second opposite ends, a front surface and a rear surface extending between said first and second ends, said front surface being a substantially flat surface, wherein said front surface comprises a fingerboard, said fingerboard comprising at least one fret fixed transversely across said fingerboard, wherein said fingerboard includes visually distinguishable markings;
   a plurality of strings disposed between said first and second ends of said housing, further wherein said plurality of strings are disposed at a predetermined clearance above said fingerboard; and
   a circuit to generate a sound having a tone, wherein the tone is selected from the group consisting of A, D, and E tones, said circuit is housed in said housing, said circuit comprising touch sensitive switches, said touch sensitive switches are in operable communication with said fingerboard,
   wherein said visually distinguishable markings are located at positions on said fingerboard corresponding to tones A, D, and E, wherein said touch sensitive switches are located beneath said markings.

4. A practice and exercise device for acoustic guitar players, comprising:
   a housing having first and second opposite ends, a front surface and a rear surface extending between said first and second ends, said front surface being a substantially flat surface, wherein said front surface comprises a fingerboard, said fingerboard comprising at least one fret fixed transversely across said fingerboard;
   a plurality of strings disposed between said first and second ends of said housing, further wherein said plurality of strings are disposed at a predetermined clearance above said fingerboard; and
   a circuit to detect when a guitarist's fingers are applying pressure to said fingerboard in appropriate alignment to generate a sound having a tone, wherein the tone is selected from the group consisting of A, D, and E tones,
   wherein said circuit comprises a plurality of touch sensitive switches, a tone E generator, a tone A generator, a tone D generator, a speaker and a power source,
   wherein said plurality of touch sensitive switches define first, second and third branches of touch sensitive switches with three touch sensitive switches in each branch,
   wherein said first, second and third branches are respectively operably connected to said tone E generator, tone A generator, and tone D generator,
   wherein each tone generator is in operable communication with said speaker,
   wherein each switch in said first, second and third branches is overlaid with a visually distinguishable marking, whereby said visually distinguishable markings help guide a guitar player in the correct positioning of the guitar player's fingers to produce a desired tone,
   whereby the tone E is generated via said speaker when a guitarist's fingers are aligned over and applying pressure on each switch in said first branch of touch sensitive switches,
   whereby the tone A is generated via said speaker when a guitarist's fingers are aligned over and applying pressure on each switch in said second branch of touch sensitive switches, and
   whereby the tone D is generated via said speaker when a guitarist's fingers are aligned over and applying pressure on each switch in said third branch of touch sensitive switches.

5. The practice and exercise device according to claim 4 further comprising a thumb insert attached to said rear surface.

6. The practice and exercise device according to claim 4, wherein said visually distinguishable markings take the form of dots.

7. The practice and exercise device according to claim 4, wherein said visually distinguishable markings take the form of dots, wherein said dots have at least one shape selected from the group consisting of: a circular shape, a regular polygonal shape, and an irregular polygonal shape.

8. The practice and exercise device according to claim 4, wherein said visually distinguishable markings take the form of dots, wherein said dots have at least one shape selected from the group consisting of: a circular shape, a square shape, a triangular shape, a star shape, and a rectangular shape.

9. The practice and exercise device according to claim 4, wherein said circuit is located inside said housing.

* * * * *